United States Patent [19]
Lee et al.

[11] Patent Number: 5,949,605
[45] Date of Patent: Sep. 7, 1999

[54] CANCELLATION AND CALIBRATION PROCEDURES OF HARMONIC DISTURBANCES IN MAGNETIC DATA STORAGE SYSTEMS

[75] Inventors: Ho Seong Lee, Palo Alto; Alan SunTzi Shih; Steven Wayne Burge, both of San Jose; Mark Andrew Pajdowski, Los Gatos, all of Calif.

[73] Assignee: Seagate Technology, Inc.

[21] Appl. No.: 08/816,769

[22] Filed: Mar. 18, 1997

Related U.S. Application Data

[60] Provisional application No. 60/013,691, Mar. 19, 1996.

[51] Int. Cl.$^6$ .................................................. G11B 5/596
[52] U.S. Cl. ............................... 360/77.04; 360/78.04; 360/78.09
[58] Field of Search ........................... 360/77.04, 78.09, 360/78.04, 78.08; 318/560, 561; 369/44.28, 44.34

[56] References Cited

U.S. PATENT DOCUMENTS

| | | | |
|---|---|---|---|
| 5,049,795 | 9/1991 | Moulds, III | 318/561 |
| 5,369,345 | 11/1994 | Phan et al. | 360/77.04 X |
| 5,404,253 | 4/1995 | Painter | 360/77.04 |
| 5,444,583 | 8/1995 | Ehrlich et al. | 360/78.09 |
| 5,550,685 | 8/1996 | Drouin | 360/77.04 X |
| 5,585,976 | 12/1996 | Pham | 360/77.04 |

OTHER PUBLICATIONS

The International Dictionary Of Applied Mathematics, D. Van Nostrand Co. inc., 1960.

*Primary Examiner*—Aristotelis M. Psitos
*Assistant Examiner*—K. Wong
*Attorney, Agent, or Firm*—Shawn B. Demster; Edward P. Heller, Jr.

[57] ABSTRACT

An adaptive feedforward method of canceling and calibrating harmonic disturbances in a magnetic disk drive storage system includes expressing harmonic disturbances to the system as d(t) and expressing an output of the system as y(t). A control signal u(t) is used to cancel the harmonic disturbance d(t), where u(t) is the estimated value of d(t) such that u(t) is an estimated value of d(t). Estimated coefficients $a_i$ and $b_i$ of u(t) are updated using the derivatives of the estimated coefficients and a constant adaptation gain $g_i$ for the ith frequency component of the disturbance. The values of estimated coefficients are implemented in real time. The control signal u(t) is combined with the system output signal y(t) to cancel u(t) from y(t). The functions representing d(t), y(t), and u(t) are included in drive code for the system. A sine function is implemented by a polynomial curve fitting method and the sine function is approximated as a polynomial function for a quarter cycle of the sine function using only four data points. Corrections for phase shift are obtained by modifying estimation equations for the coefficients of d(t) using a d-step delay in a position error signal (PES) measurement for the system. Calibration of the control signal u(t) is initiated in several ways. The coefficient function $G_p(s)$ for y(t) can be a simple plant transfer function or a plant transfer function with a feedback controller which stabilizes the open-loop plant and satisfies a desired specifications, including track-following.

12 Claims, 3 Drawing Sheets

CANCELLATION AND CALIBRATION PROCEDURES OF HARMONIC DISTURBANCES IN MAGNETIC DATA STORAGE SYSTEMS

This application claims benefit of Provisional Appl. 60/013,691 filed Mar. 19, 1996.

BACKGROUND OF THE INVENTION

1. Field of the Invention

This invention relates to the cancellation and calibration procedures for removal of disturbances in magnetic disk storage systems.

2. Prior Art

Repeatable runouts (RRO) in magnetic disk drives are caused by a number of items, such as inaccuracy in disk assembly, unbalanced platters, spindle motor shaft tilt, servo writer noise and disk slippage after a shock, and so on. Especially in PERM (Pre-Embossed Rigid Magnetic) disks, since the tracks, including servo sectors, are pre-embossed and assembled into the drive there are runouts mainly due to the inherent eccentricity of the tracks. Typically, RRO are harmonic disturbances synchronized by rotation of a disk. As the track density (or tracks per inch, TPI) of a disk increases, this harmonic disturbance, that is, RRO, will become a dominant factor in track following errors, since runouts are not scaleable with the track density.

High-capacity disk drives have been tested with an RRO compensator based on the discrete Fourier transform (DFT) method [Hobson, D., "Feed Forward with Seeks on Kiowa 2!," Control Systems Database (Seagate), Mar. 29, 1995, and Hobson, D., "Feed Forward/RRO Compensation Successful on Hawk 2 XL," Control Systems Database (Seagate), Dec. 22, 1995]. The need for an RRO compensator was especially keen for dedicated-servo drives. Although RRO are less severe in an embedded servo (or sector servo) drive, a RRO compensator is required for a multi-disk high TPI drive. RRO compensation based on DFT requires at least one full revolution of a disk before compensation becomes effective. Hence this technique is not suitable for a drive with large RRO such as a removable drive.

After various RRO cancellation algorithms were tested, the AFC (Adaptive Feedforward Cancellation) algorithm was proved to be the most effective and efficient for disk drive applications. AFC was proposed and tested for disk drive applications by various researchers at Carnegie Mellon University (CMU) and University of Utah (notably by Professor Marc Bodson). The results are published in Sacks et al., "Experimental Results of Adaptive Periodic Disturbance Cancellation in a High Performance Magnetic Disk Drive," *Proceedings of the American Control Conference*, San Francisco, Calif., pp. 686–690, June 1993; Messner et al., "Design of Adaptive feedforward Controllers Using Internal Model Equivalence," *Proceedings of the American Control Conference*, Baltimore, Md., pp. 1619–1623, June 1994; Bodson et al. "Harmonic Generation in Adaptive Feedforward Cancellation Schemes," *IEEE Transactions on Automatic Control*, Vol. 39, No. 9, pp. 1939–1994, September 1994; and Sacks et al., "Advanced Method for Repeatable Runout Compensation", *IEEE Transactions on Magnetics*, Vol. 31, No. 2, pp. 1031–1036, March 1995. Although not specifically demonstrated, it is believed that their algorithms are derived from adaptive control theory, see, for example, a classical textbook written by Sastry, S. and Bodson, M., "*Adaptive Control: Stability, Convergence and Robustness,*" Englewood Cliffs, N.J., Prentice-Hall, 1987.

It turned out that AFC was equivalent to the Least Mean Square (LMS) adaptation algorithm developed for adaptive filters [Widow, B. and Stearns, S. D., "*Adaptive Signal Processing,*" Englewood Cliffs, N.J., Prentice-Hall, 1985; and Haykin, S., "*Adaptive Filter Theory,*" Second Edition, Englewood Cliffs, N.J., Prentice-Hall, 1991]. Surprisingly the AFC researchers (at CMU and Utah) never mentioned about this link. LMS algorithms have been used in digital signal processing for a long time. They are especially effective for identification and cancellation of sinusoidal interference (adaptive noise cancellation problem). A similar algorithm based on LMS was patented by Workman, M. L, "Disk Drive File Servo Control System with Fast Reduction of Repeatable Head Position Error," U.S. Pat. No. 4,616,276, October 1986, for disk drive applications. The similarities and differences between AFC and Workman's work are discussed herein below.

After AFC was successfully implemented for the PERM disks, an AFC algorithm was tested for production disk drives. Various modifications and ideas for code optimization were added for actual implementation in order to avoid the need for extra hardware. The AFC algorithm performed well in Seagate ST9630 and ST9810 drives.

As disk drive companies, such as Seagate, plan to enter into a removable-media drive market, the performance of the removable drives will be heavily dependent on a repeatable runout (RRO) compensator as well as on a drive servo controller. Even for fixed disk drives, a powerful RRO compensator will be needed as track density increases. It is expected that a drive with more than 8,000 TPI will require the RRO compensator. Multi-platter disk drives sometimes show excessive runouts when they are installed (or tilted) in the vertical position. Even for a crashed drive due to disk slippage after an excessive shock, an effective RRO compensator will allow the drive to be used to recover user data. In summary, the RRO compensator is critical in the following applications: 1) Removable drives (i.e., PERM removable drives); 2) High-TPI drives; 3) Multi-platter drives; and 4) Data recovery operations after disk slippage.

SUMMARY OF THE INVENTION

It is therefore an object of the invention to provide an improved adaptive feedforward method of canceling and calibrating harmonic disturbances, including RRO, in a magnetic disk drive storage systems.

In accordance with this and other objects of the invention, an adaptive feedforward method of canceling and calibrating harmonic disturbances in a magnetic disk drive storage system is provided. The method includes the steps of expressing harmonic disturbances to the system as d(t) and expressing an output of the system as y(t). A control signal u(t) is generated and is used to cancel the harmonic disturbance d(t), where u(t) is the estimated value of d(t) such that u(t) is an estimated value of d(t). Estimated coefficients $a_i$ and $b_i$ of u(t) are updated using the derivatives of the estimated coefficients and a constant adaptation gain $g_i$, where the parameter $g_i$ is a constant adaptation gain and the subscript i refers to the ith frequency component of the disturbance. The values of estimated coefficients are implemented in real time. The control signal u(t) is combined with the system output signal y(t) to cancel u(t) from y(t). The functions representing d(t), y(t), and u(t) are included in drive code for the system.

A sine function is implemented by a polynomial curve fitting method and the sine function is approximated as a polynomial function. Curve fitting is used for a quarter cycle of the sine function using only four data points for evaluation of the sine function.

The method of claim 1 including the step of correcting for phase shift by modifying estimation equations for the coefficients of d(t) using a d-step delay in a position error signal (PES) measurement for the system.

Calibration of the control signal u(t) is initiated in several ways. One is when drive code for the system detects that a target head is not calibrated and when write settle criteria are commanded for the system such that calibration delays are in a user's critical path. Another includes the step of initiating calibration of the control signal u(t) at a later time after drive code for the system initially detects that a head is not calibrated. Another includes initiating calibration of the control signal u(t) under control of the drive code for the system, which enables the calibration to be interruptible.

The coefficient function $G_p(s)$ for y(t) can be a simple plant transfer function or a plant transfer function with a feedback controller which stabilizes the open-loop plant and satisfies a desired specifications, including track-following.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Figure 1:
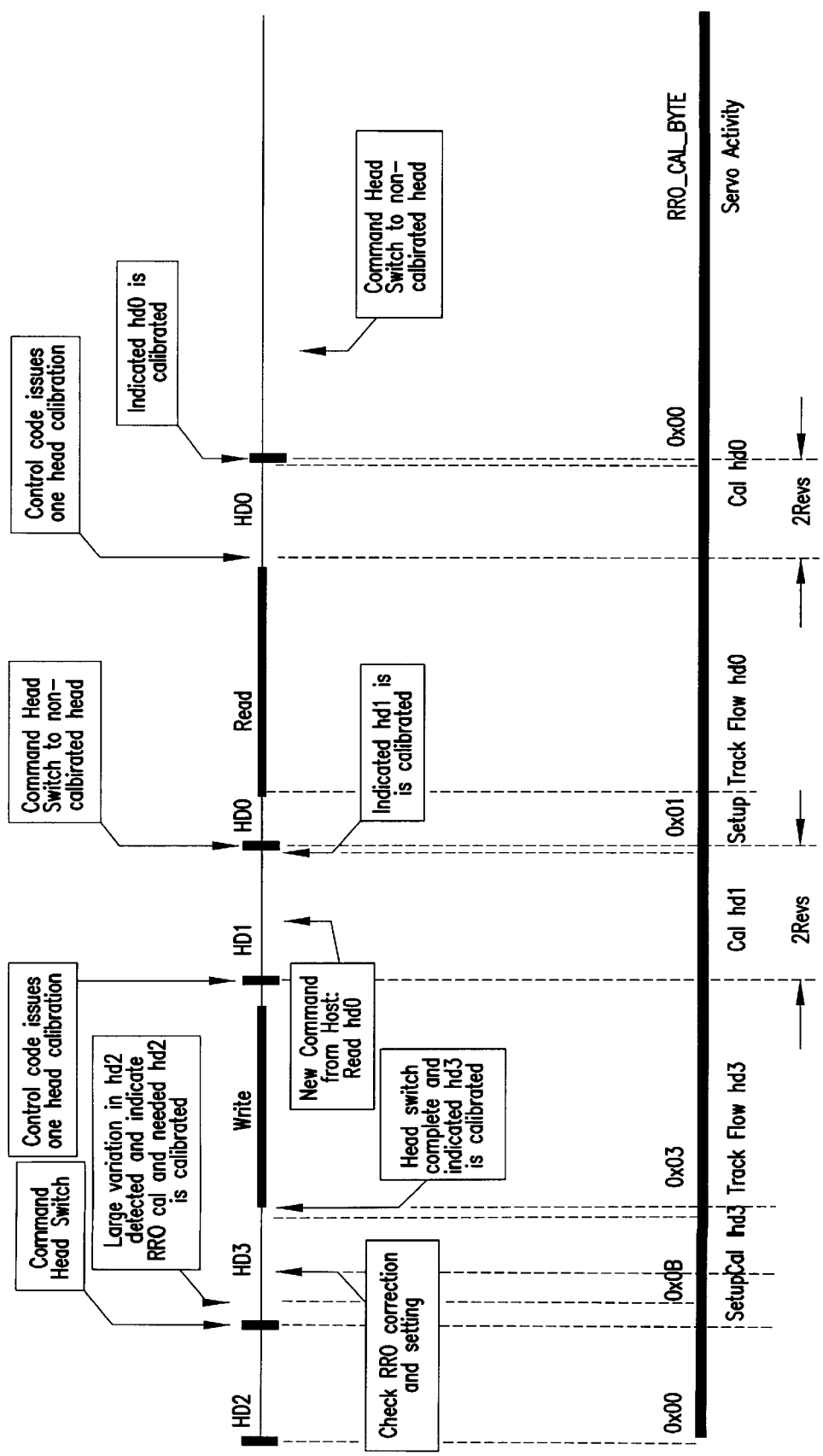
FIG. 1 is a chart illustrating operation of a disk drive system in which calibration of the control signal u(t) is started at a later time after drive code for the system initially detects that a head is not calibrated.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

The AFC development described in this section is based on Sacks et al., "Experimental Results of Adaptive Periodic Disturbance Cancellation in a High Performance Magnetic Disk Drive," *Proceedings of the American Control Conference*, San Francisco, Calif., pp. 686–690, June 1993; and Sacks et al., "Advanced Method for Repeatable Runout Compensation, " *IEEE Transactions on Magnetics*, Vol. 31, No. 2, pp. 1031–1036, March 1995. Derivation of AFC is also possible by the least-mean-square (LMS) adaptation algorithm [Widrow, B. and Stearns, S. D., "*Adaptive Signal Processing*," Englewood Cliffs, N.J., Prentice-Hall, 1985; and Haykin, S., "*Adaptive Filter Theory*," Second Edition, Englewood Cliffs, N.J., Prentice-Hall, 1991]. It is assumed that the unknown disturbance d(+) consists of a sum of N sinusoids of known frequencies of the form $$d(t) = \sum_{i=1}^{N} \{a_i \cos(\omega_i t) + b_i \sin(\omega_i t)\} \quad (1)$$

while the output y(t) of the system is $$y(t) = G_p(s)[u(t) - d(t)]. \quad (2)$$

$G_p(s)$ can be a simple plant transfer function or it may include a feedback controller which will stabilize the open-loop plant and satisfy desired specifications such as track-following. The goal of AFC design is to construct a control input that exactly cancels the periodic disturbance in (1). The control input has the form $$u(t) = \hat{d}(t) = \sum_{i=1}^{N} \{\hat{a}_i(t)\cos(\omega_i t) + \hat{b}_i(t)\sin(\omega_i t)\} \quad (3)$$

where d(t) is an estimate of the unknown disturbance.

The disturbance will be exactly canceled when the estimates of the coefficients $\hat{a}_i$ and $\hat{b}_i$ have the nominal values $$\hat{a}_i(t) = a_i \text{ and } \hat{b}_i(t) = b_i. \quad (4)$$

An adaptive algorithm to adjust estimate of $a_i$ and $b_i$ consists of the following update laws $$\frac{d}{dt}\hat{a}_i(t) = g_i y(t)\cos(\omega_i t + \phi_i) \quad (5)$$

$$\frac{d}{dt}\hat{b}_i(t) = g_i y(t)\sin(\omega_i t + \phi_i) \quad (6)$$

where parameters $g_i$ are the constant adaptation gain and the subscript i refers to the ith frequency component of the disturbance (typically the ith harmonic of the fundamental frequency). In Workman (1986), $g_i$ is referred to as the "learning rate" and it can be updated at each sample for faster adaptation. In the basic AFC algorithm, the $\phi_i$ term is set to zero. The case with nonzero $\phi_i$ is called the "modified" AFC. By choosing $\phi_i$ in Equations (5) and (6) to be the phase of the transfer function Gp(s) at the frequency $\omega_i$, the sensitivity of the adaptive controller could be reduced with an improved transient response. The adaptation algorithm in Equations (5) and (6) are implemented in discrete-time as follows $$\hat{a}_i(kT_s) = \hat{a}_i((k-1)T_s) + g_i y(kT_s) \cos(\omega_i kT_s + \phi_i) \quad (7)$$

$$\hat{b}_i(kT_s) = \hat{b}_i((k-1)T_s) + g_i y(kT_s) \sin(\omega_i kT_s + \phi_i). \quad (8)$$

Comparison Between AFC and Workman's Work

In Workman's invention, $\phi_i$ is not considered, i.e., $\phi_i$=0. And he claimed that any number of harmonic disturbances could be canceled by just adding them. However, researchers at CMU and Utah reported that they were not able to cancel more than four harmonic components at the same time. Hence, an appropriate selection of $\phi_i$ is necessary. The procedure is presented in their paper. The present invention sets $\phi_i$=0.

Workman proposed to use a unique learning rate for faster convergence and cancellation. He proposed a time-varying $g_i$ instead of constant $g_i$. Details can be found in Workman, M. L, "Disk Drive File Servo Control System with Fast Reduction of Repeatable Head Position Error," U.S. Pat. No. 4,616,276, October 1986. The present invention uses a constant value for $g_i$.

There are minor subtle points in how differentiation in Equations (5) and (6) is represented in digital implementation. The present invention uses Equations (7) and (8).

New Features in The Present Invention

No additional hardware needed. In Workman's implementation, an extra microprocessor and memory devices were added to specifically accomplish RRO compensation. In the present invention, the algorithm is added into the disk drive codes without requiring additional hardware.

Implementation of sine function is different. Typically the sine function is implemented as a look-up table. This requires storing values corresponding to a half or a quarter cycle of the sine function. Hence a half or a quarter samples per revolution is required. For example, for a drive with 64 sectors per revolution, 16 memory locations are needed. For a drive with 54 sectors per revolution, 27 memory locations are needed. Since the memory in the drive is very precious, the sine function has been implemented by a polynomial curve fitting method. The sine function is approximated as $$\sin(x)=c_1 x+c_2 x^2+c_3 x^3+c_4 x^4 \quad (9)$$

where $c_1$, $c_2$, $c_3$, and $c_4$ are constants. The curve fitting is done by using a commercially available mathematics tool such as Matlab. The range of curve fitting is done for a quarter cycle of the sine function, i.e., $0 \leq x \leq \pi/2$). Hence only four data points are needed for evaluation of the sine function.

The present invention provides for modification of AFC for compensation of time delay. Although the AFC algorithm is relatively robust on the PES measurement error because we assumed that we know the frequency of the harmonic disturbance, there are some effects, such as, phase error or phase shift, due to measurement time delay due to the limited computing power of the microprocessors currently implemented in drives. Since the microprocessor is busy calculating the control signal for track-following as soon as the PES measurement is done, there is not enough time to finish AFC calculation for RRO compensation. Hence the drive has to wait until the moment when the microprocessor is no longer busy. This implies typically one sample delay in compensation. Although not much phase shift or error has been observed, this phase shift problem is corrected by modifying Equations (7) and (8) as follows to get Equations (10) and (11).

$$\hat{a}_i(kT_s)=\hat{a}_i((k-1)T_s)+g_a y((k-d)T_s) \cos(\omega_i(k-d)T_s+\phi_i) \quad (10)$$

$$\hat{b}_i(kT_s)=\hat{b}_i((k-1)T_s)+g_a y((k-d)T_s) \cos(\omega_i(k-d)T_s+\phi_i). \quad (11)$$

where d is a d-step delay in the PES measurement. Improvements due to this modification have been observed by simulations and experiments.

Calibration procedure 1: Even though the correction is always active and can adapt to a changing environment, the adaptation only applies to current track-following head. Therefore, when a large deviation in calibrated value detected, servo code will indicate RRO calibration is needed.

The simplest way of handling calibration will be letting drive code calibrate on head to head basis. Drive code will force head calibration when it detects the target head is not calibrated and delay command complete approximately 2 revs. The calibration will only be initiated when write settle criteria is commanded and nothing will be done when read settle criteria is encountered. This implementation will be the least impact to code, or best favored by coders, but the calibration delay is in the user critical path. Since a change of environment does happen but not frequently, the impact should be minimally felt by users.

Calibration procedure 2: Another method of calibration implementation s far more complicated but does remove most of the calibration time out of user critical path. The RRO calibration routine is setup to be one head calibration only. When it is called, it will first determine which head to be calibrated, check if all heads are calibrated, modify the indicator if further calibration needed, and return control to the caller. Effective, the calibration is divided into several smaller portions to minimize servo busy time.

An example of operation is shown in FIG. 1. When RRO—CAL—BYTE is nonzero, RRO calibration is needed. Read settle criteria and write settle criteria settling are treated very differently. In the case of read settle, the system disregards the RRO correction checking. On the other hand, with write settle, the system will check for position settle as well as RRO correction settle. Therefore, there may be up to 2 revs of delay between host command write to actual drive operation in a non-calibrated with zero length seek.

Figure 2:
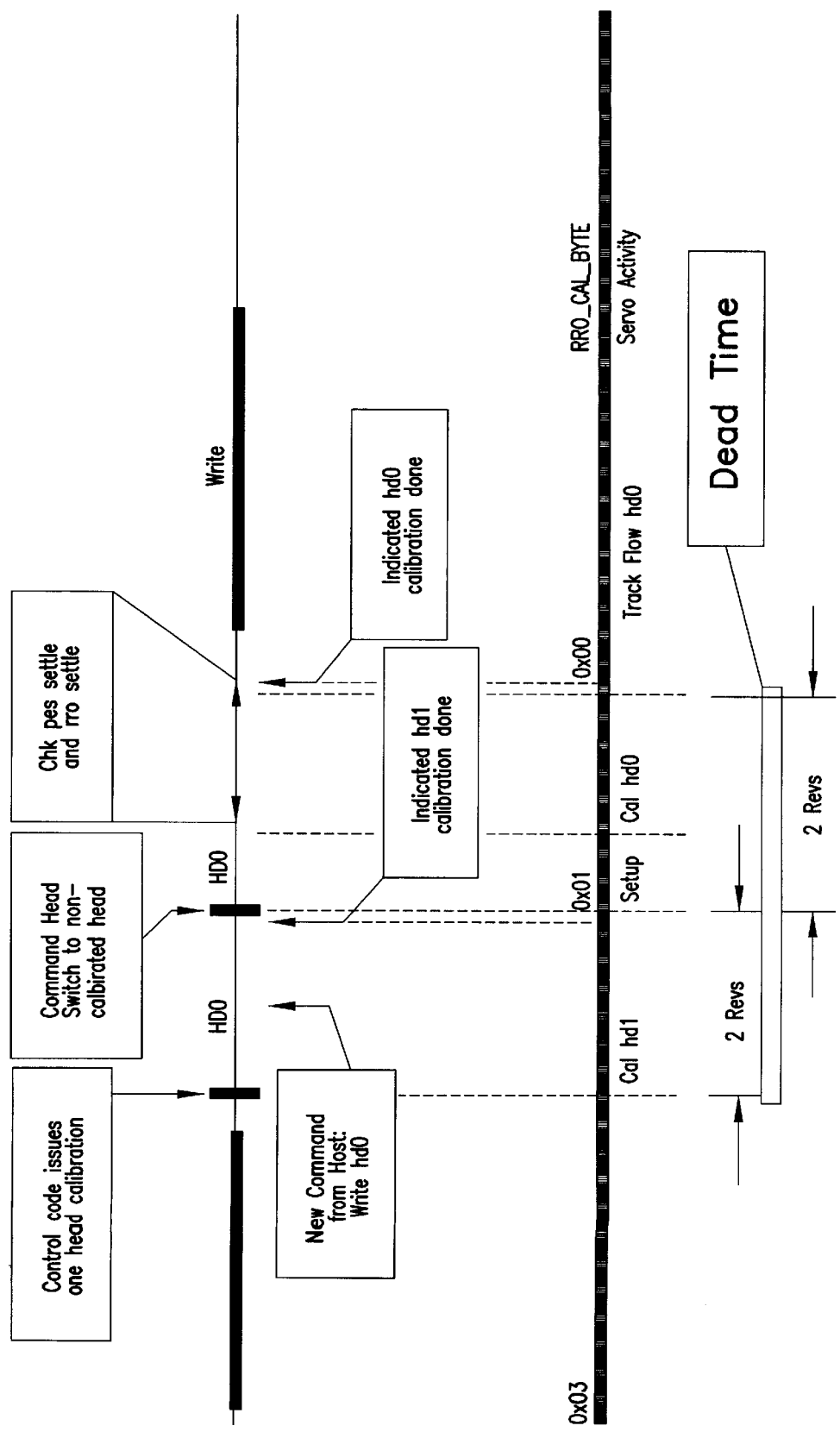
FIG. 2 is a chart similar to that of FIG. 1 illustrating a worst case scenario for the arrangement of FIG. 1.

The worst case scenario for servo delay time is shown in FIG. 2. With approximately 4 rev of dead time maximum from host command to actual drive operation. The system is designed so that controller code can decide upon issuing calibration command or not, depending on system load with the maximum possible dead time of 4 disk revolutions. It is possible to do calibration on demand instead of calibration on command as mentioned above.

The benefit of the previous implementation is that large percentage of bookkeeping task is inclusive in drive code. However, it has a very long maximum dead time (~4 revs) and does not take advantage of read pass as calibration if it is long enough to satisfy calibration criteria.

Figure 3:
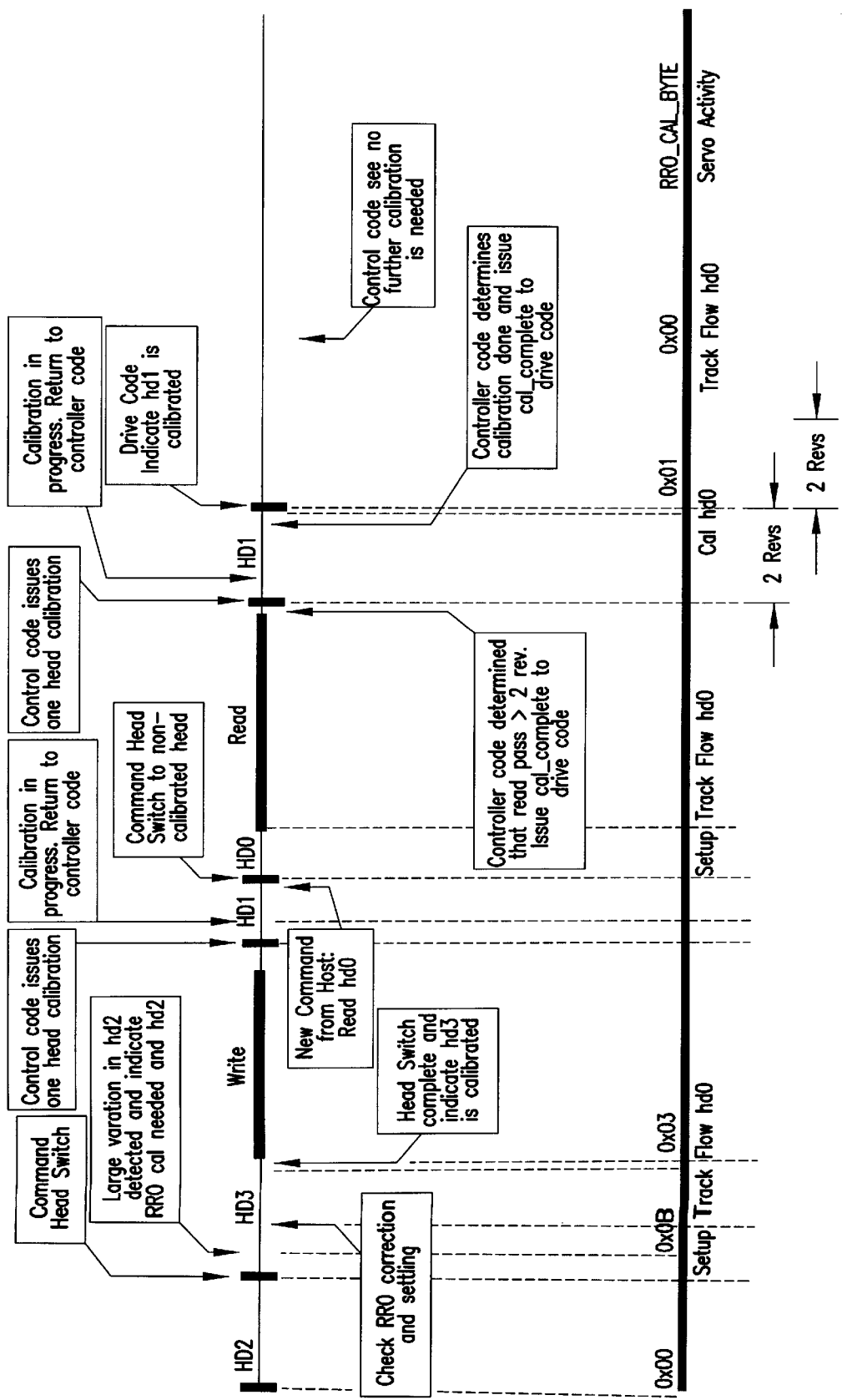
FIG. 3 is a chart illustrating operation of a disk drive system in which calibration is under control of the drive code for the system, which enables the calibration to be interruptible.

Calibration procedure 3: We can structure the calibration routine to be interruptible at will. However, this will require the controller task to take up more of the bookkeeping functions. FIG. 3 shows an example of the operation. As illustrated, controller task will be responsible in keeping track of calibration timing and issuing cal complete. This enables the calibration to be interruptible since controller code has the power to decide not to issue cal complete but the next command from host. Cal complete can be issued anytime to indicate present head is RRO calibrated; therefore, the drive can take advantage of read pass as part of calibration shown above.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. An adaptive feedforward method of canceling and calibrating harmonic disturbances in a magnetic disk drive storage system, comprising the steps of:

expressing harmonic disturbances to the system as $$d(t) = \sum_{i=1}^{N} \{a_i\cos(\omega_i t) + b_i\sin(\omega_i t)\}$$

expressing an output of the system as $y(t)=G_p(s)[u(t)-d(t)]$;

generating a control signal u(t) that is used to cancel the harmonic disturbance d(t), where u(t) is the estimated value of d(t) such that $$u(t) = d(t) = \sum_{i=1}^{N} \{\hat{a}_i(t)\cos(\omega_i t) + \hat{b}_i(t)\sin(\omega_i t)\};$$

updating the estimated coefficients $a_i$ and $b_i$ according to the following rule:

$d/dt\ \hat{a}_i(t) = gi\ y(t)\ \cos(\omega_i t)$ and $d/dt\ \hat{b}_i(t) = gi\ y(t)\ \sin(\omega_i t)$;

where the parameter $g_i$ is a constant adaptation gain and the subscript i refers to the ith frequency component of the disturbance;

implementing $d/dt\ \hat{a}_i(t) = gi\ y(t)\ \cos(\omega_i t)$ and $d/dt\ \hat{b}_i(t) = gi\ y(t)\ \sin(\omega_i t)$ in discrete time as:

$\hat{a}_i(kT_s) = \hat{a}_i((k-1)T_s) + g_i\ y(kT_s)\ \cos(\omega_i kT_s + \phi_i)$;

$\hat{b}_i(kT_s) = \hat{b}_i((k-1)T_s) + g_i\ y(kT_s)\ \sin(\omega_i kT_s + \phi_i)$ combining u(t) with y(t) to cancel u(t) from y(t);

wherein the functions representing d(t), y(t), and u(t) are included in drive code for the system; and wherein the sine function of $\hat{b}_i(kT_s) = \hat{b}_i((k-1)T_s) + g_i\ y(kT_s)\ \sin(\omega_i kT_s + \phi_i)$ is implemented by a polynomial curve fitting method.

2. The method of claim 1 wherein the sine function is approximated as $\sin(x) = c_1 x + c_2 x^2 + c_3 x^3 + c_4 x^4$ where $c_1$, $c_2$, $c_3$, and $c_4$ are constants.

3. The method of claim 1 wherein curve fitting is used for a quarter cycle of the sine function using only four data points for evaluating of the sine function.

4. The method of claim 1 including the step of correcting for phase shift by modifying $\hat{a}_i(kT_s) = \hat{a}_i((k-1)T_s) + g_i\ y(kT_s)\ \cos(\omega_i kT_s + \phi_i)$ and $\hat{b}_i(kT_s) = \hat{b}_i((k-1)T_s) + g_i\ y(kT_s)\ \sin(\omega_i kT_s + \phi_i)$ $\hat{a}_i(kT_s) = \hat{a}_i((k-1)T_s) + g_i\ y((k-d)T_s)\ \cos(\omega_i(k-d)T_s + \phi_i)$ and $\hat{b}_i(kT_s) = \hat{b}_i((k-1)T_s) + g_i\ y((k-d)T_s)\ \cos(\omega_i(k-d)T_s + \phi_i)$ wherein where d is a d-step delay in a position error signal (PES) measurement for the system.

5. The method of claim 1 including the step of initiating calibration of the control signal u(t) when drive code for the system detects that a target head is not calibrated and when write settle criteria are commanded for the system such that calibration delays are in a user's critical path.

6. The method of claim 1 including the step of starting calibration of the control signal u(t) at a later time after drive code for the system initially detects that a head is not calibrated.

7. The method of claim 1 including the step of initiating calibration of the control signal u(t) under control of the drive code for the system which enables the calibration to be interruptible.

8. The method of claim 1 wherein $G_p(s)$ is a simple plant transfer function.

9. The method of claim 8 wherein $G_p(s)$ is a plant transfer function with a feedback controller which stabilizes the open-loop plant and satisfies a desired specifications, including track-following.

10. An adaptive feedforward method of canceling and calibrating harmonic disturbances in a magnetic disk drive storage system, including correction for phase shift, comprising the steps of:

expressing harmonic disturbances to the system as $$d(t) = \sum_{i=1}^{N} \{a_i\cos(\omega_i t) + b_i\sin(\omega_i t)\}$$

expressing an output of the system as $y(t)=G_p(s)[u(t)-d(t)]$;

generating a control signal u(t) that is used to cancel the harmonic disturbance d(t), where u(t) is the estimated value of d(t) such that $$u(t) = d(t) = \sum_{i=1}^{N} \{\hat{a}_i(t)\cos(\omega_i t) + \hat{b}_i(t)\sin(\omega_i t)\};$$

updating the estimated coefficients $a_i$ and $b_i$ according to the following rule:

$d/dt\ \hat{a}_i(t) = gi\ y(t)\ \cos(\omega_i t)$ and $d/dt\ \hat{b}_i(t) = gi\ y(t)\ \sin(\omega_i t)$;

where the parameter $g_i$ is a constant adaption gain and the subscript i refers to the ith frequency component of the disturbance;

implementing $d/dt\ \hat{a}_i(t) = gi\ y(t)\ \cos(\omega_i t)$ and $d/dt\ \hat{b}_i(t) = gi\ y(t)\ \sin(\omega_i t)$;

in discrete time as:

$\hat{a}_i(kT_s) = \hat{a}_i((k-1)T_s) + g_i\ y(kT_s)\ \cos(\omega_i kT_s + \phi_i)$;

$\hat{b}_i(kT_s) = \hat{b}_i((k-1)T_s) + g_i\ y(kT_s)\ \sin(\omega_i kT_s + \phi_i)$ combining u(t) with y(t) to cancel u(t) from y(t);

wherein the functions representing d(t), y(t), and u(t) are included in drive code for the system;

wherein the sine function of $\hat{b}_i(kT_s)=\hat{b}_i((k-1)T_s)+g_i\, y(kT_s) \sin(\omega_i kT_s+\phi_i)$ is implemented by a polynomial curve fitting method; and correcting for phase shift by modifying $\hat{a}_i(kT_s)=\hat{a}_i((k-1)T_s)+g_i\, y(kT_s)\, \cos(\omega_i kT_s+\phi_i)$ and $\hat{b}_i(kT_s)=\hat{b}_i((k-1)T_s)+g_i\, y(kT_s)\, \sin(\omega_i kT_s+\phi_i)$ to $\hat{a}_i(kT_s)=\hat{a}_i((k-1)T_s)+g_i\, y((k-d)T_s)\, \cos(\omega_i(k-d)T_s+\phi_i)$ and $\hat{b}_i(kT_s)=\hat{b}_i((k-1)T_s)+g_i\, y((k-d)T_s)\, \cos(\omega_i(k-d)T_s+\phi_i)$, where d is a d-step delay in a position error signal (PES) measurement for the system.

11. The method of claim 10 wherein the sine function is approximated as the polynomial $$\sin(x)=c_1 x+c_2 x^2+c_3 x^3+c_4 x^4$$

where $c_1$, $c_2$, $c_3$, $c_4$ are constants.

12. The method of claim 10, wherein curve fitting is used for a quarter cycle of the sine function using only four data points for evaluation of the sine function.

* * * * *